United States Patent
Bedi et al.

(10) Patent No.: US 7,886,012 B2
(45) Date of Patent: Feb. 8, 2011

(54) ELECTRONIC CONVERSATION TEXT SUMMARIZATION

(75) Inventors: Bharat Veer Bedi, Portsmouth (GB); Marc Stanley Carter, Southampton (GB); Martin J. Gale, Hampshire (GB); Lucas William Partridge, Southampton (GB); Andrew James Stanford-Clark, Isle of Wight (GB)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 11/560,503

(22) Filed: Nov. 16, 2006

(65) Prior Publication Data

US 2007/0130257 A1   Jun. 7, 2007

(30) Foreign Application Priority Data

Nov. 24, 2005   (GB) .................................. 0523887.8

(51) Int. Cl.
*G06F 15/16* (2006.01)
(52) U.S. Cl. ........................ 709/206; 709/204; 709/205; 709/207
(58) Field of Classification Search ................. 704/235, 704/256; 709/204, 205, 206, 207
See application file for complete search history.

(56) References Cited

U.S. PATENT DOCUMENTS

| | | | |
|---|---|---|---|
| 6,101,532 A * | 8/2000 | Horibe et al. ............... | 709/206 |
| 6,434,599 B1 * | 8/2002 | Porter ......................... | 709/204 |
| 2003/0061396 A1 * | 3/2003 | Wen et al. ................... | 709/313 |
| 2003/0177190 A1 * | 9/2003 | Moody et al. ............... | 709/206 |
| 2004/0122657 A1 * | 6/2004 | Brants et al. ................... | 704/9 |
| 2004/0186989 A1 * | 9/2004 | Clapper ....................... | 713/151 |
| 2005/0193062 A1 * | 9/2005 | Komine et al. .............. | 709/204 |
| 2007/0048719 A1 * | 3/2007 | He et al. ..................... | 434/350 |
| 2007/0124405 A1 * | 5/2007 | Ulmer et al. ................ | 709/207 |
| 2007/0168552 A1 * | 7/2007 | Alse et al. ................... | 709/245 |
| 2009/0282106 A1 * | 11/2009 | Jaffer et al. ................. | 709/206 |

OTHER PUBLICATIONS

Vimal Kumar Varun, "Automatic Abstracting and Summarizing Tools", http://itt.nissat.tripod.com/itt0202/ruoi0202.htm, ISSN 0971-7102, vol. 21 No. 2, Jun. 2002.

* cited by examiner

*Primary Examiner*—Nathan Flynn
*Assistant Examiner*—Aftab N Khan
(74) *Attorney, Agent, or Firm*—DeLizio Gilliam, PLLC

(57) ABSTRACT

Summarization of text in a document may be requested in dependence upon the position of the text in relation to other text within the document or the position of the document containing the text within a plurality of documents in a document structure. Summarization of text in a document may also be requested in dependence upon a user's interaction with an application in conjunction with a version of the document or with a document structure including the document. Different levels of summarization may be applied to different segments of text within a document.

20 Claims, 4 Drawing Sheets

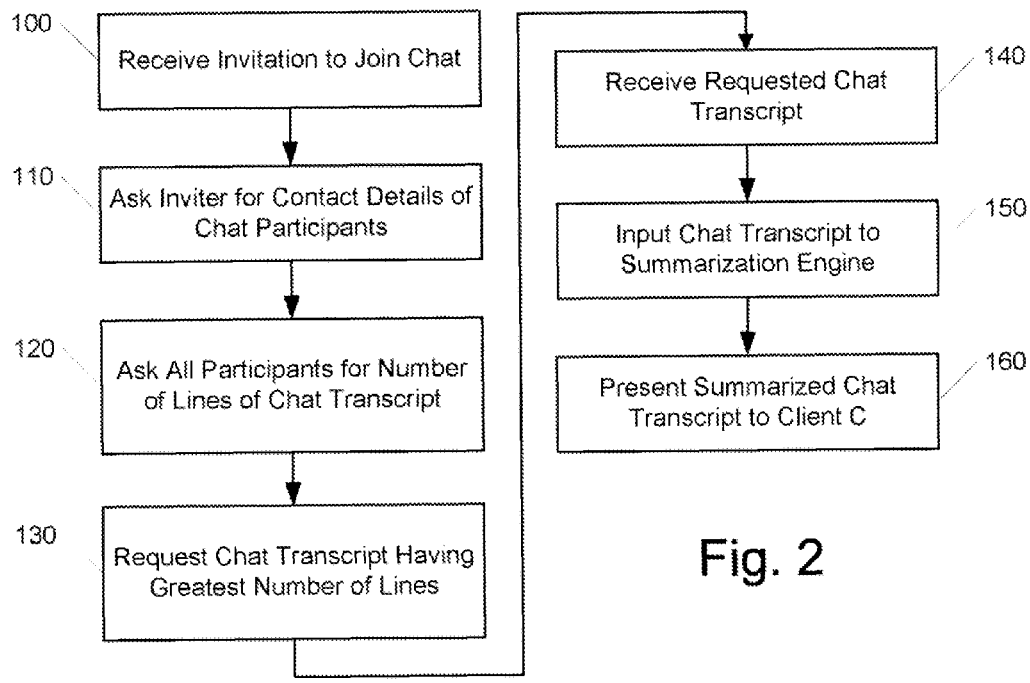
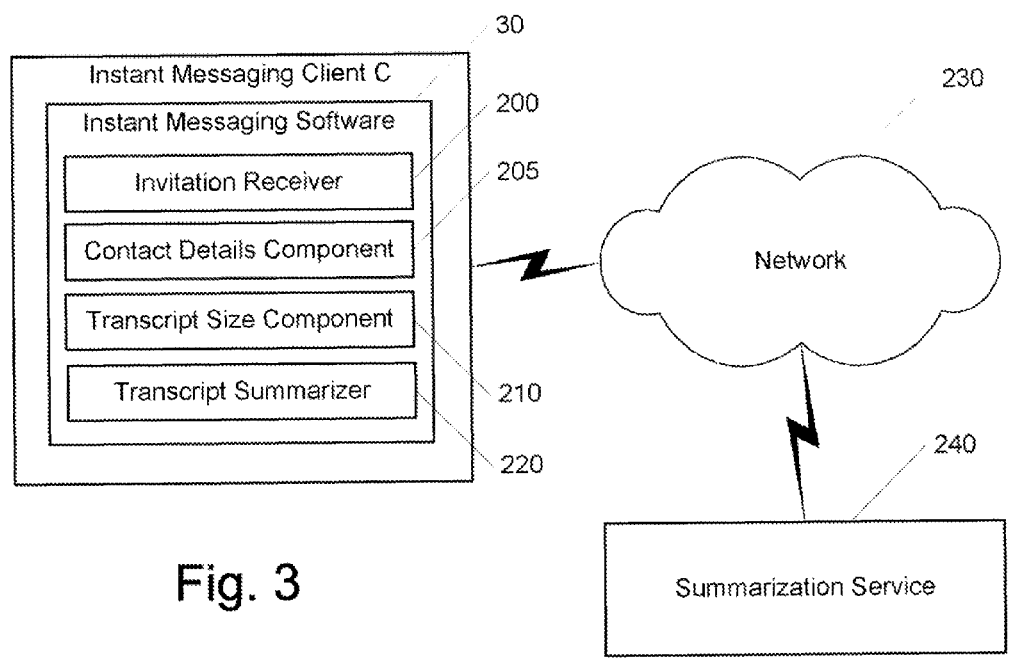

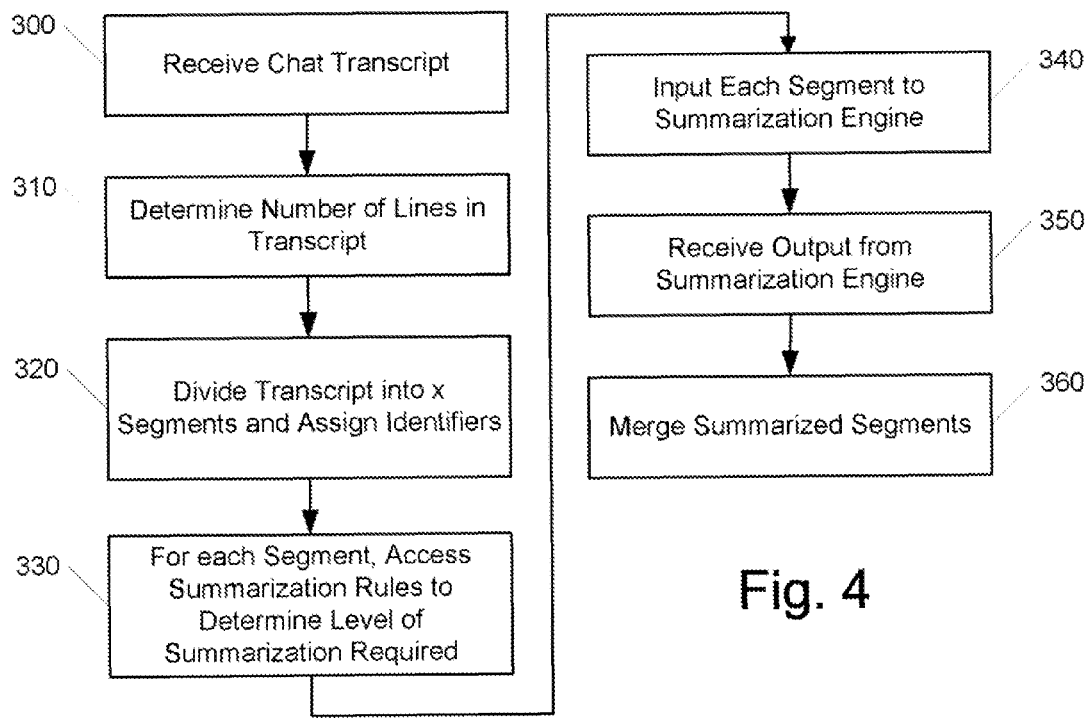
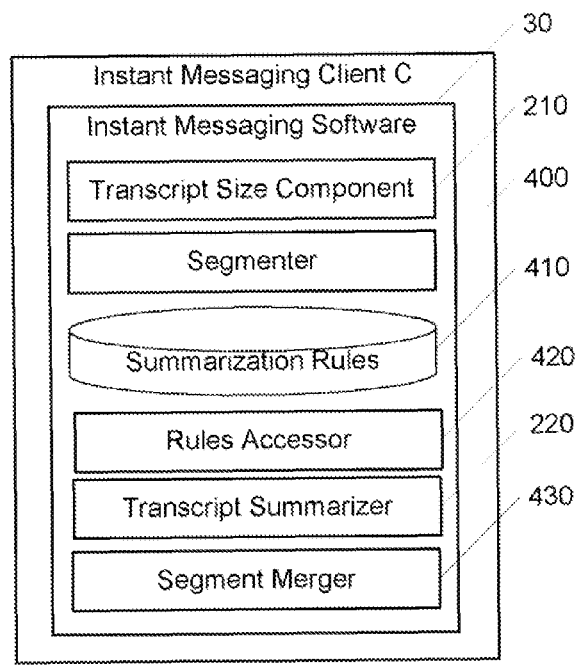
Fig. 4
Fig. 5

ELECTRONIC CONVERSATION TEXT SUMMARIZATION

FIELD OF THE INVENTION

The invention relates to summarization of text.

BACKGROUND OF THE INVENTION

There are two main kinds of person-to-person communication using, a computer; email and various forms of real-time chat, also known as instant messaging. Instant messaging systems allow people to type messages to one another and for those messages to appear almost instantaneously on the addressee's display screen. Such systems enable a more natural interaction and discussion to take place than is possible via email.

As users type, their chat system creates a "chat transcript" showing what each user says. The format is typically "name: speech" (e.g. Nicki: What time are you lunching?). The collected messages exchanged during a chat can be viewed as a chat conversation.

The chat transcript is typically stored locally at each client participating in a chat. Each participant's chat transcript typically displays messages that are generated once a participant joins the chat. If a participant joins the chat but is then is distracted, messages generated by other participants may scroll off the screen and effectively become "lost" to the distracted participant. Unless current participants paraphrase what happened before a participant joined or while the participant was distracted, that participant may miss part of the discussion and have trouble catching up while the discussion continues.

Technology for summarizing information is already known. Also, U.S. Pat. No. 6,101,532 teaches the summarization of a threaded discussion while US Patent Application Publication 2004/0122657 discloses techniques for interactive topic-based summarization in which sentences are selected for inclusion in a topic based summary based on associated high scores resulting from, for example, a sentence's placement in a piece of text.

However, there is a need in the industry for improved techniques for summarizing text.

SUMMARY OF THE INVENTION

The invention may be implemented as a method for summarizing text in a document for the benefit of a user. Text to be summarized is selected as a function of a property of the text relative to properties of the document including the text. The selected text is processed using a summarization engine.

BRIEF DESCRIPTION OF THE DRAWINGS

A preferred embodiment of the present invention will now be described by way, of example only, with reference to the following drawings:

FIG. 2 illustrates a process by which a summary of an instant messaging transcript is created in accordance with a preferred embodiments of the present invention;

FIG. 3 illustrates the components of a system for performing the process illustrated in FIG. 2;

FIG. 4 illustrates a process for segmenting a chat transcript for summarizing the resulting segments to varying degrees according to a preferred embodiment of the present invention;

FIG. 5 illustrates the components of a system for performing the process illustrated in FIG. 4;

DETAILED DESCRIPTION

Instant Messaging can be implemented in a variety of different ways. Users typically have lists of "buddies" with whom they communicate on a regular basis. In one known type of instant messaging system, a user contacts an instant messaging server that can determine which of the user's buddies are online. The server then sends the user the necessary contact details pertaining to the user's online buddies and also ensures that the user is visible to other users. Subsequent communication then takes place directly between the user and another person. The server, once having provided the contact information, does not need to become involved in the actual conversation. The server plays no further role until a user terminates a session. When that happens, the user's machine informs the server so the server can change the user's status to offline.

Figure 1:
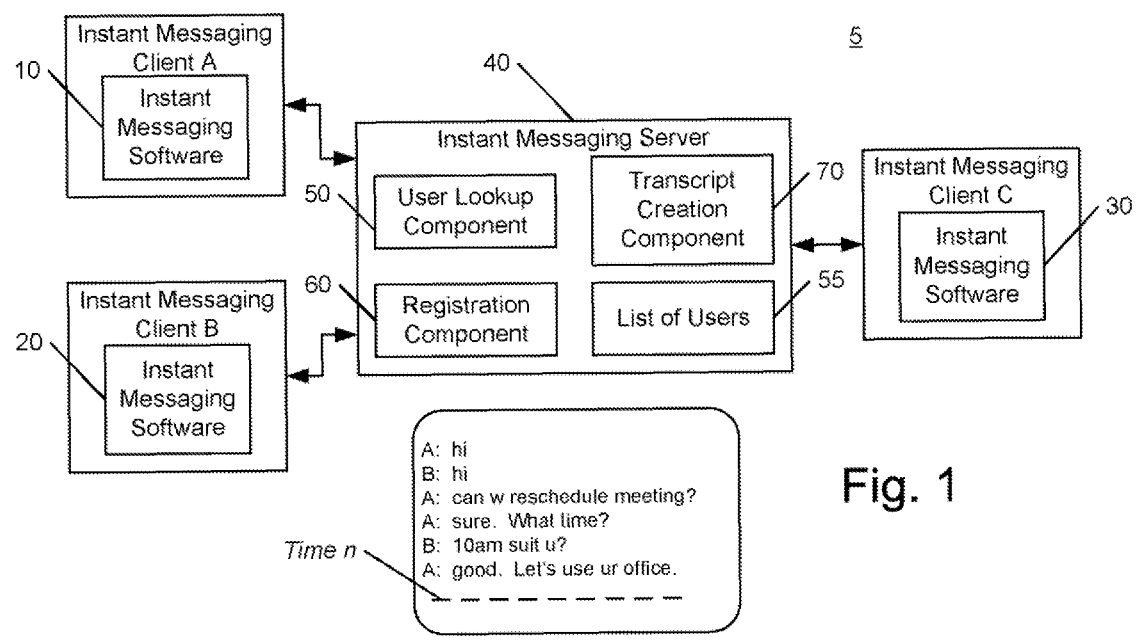
FIG. 1 shows an example of how an instant messaging system may be implemented.

Another well known type of instant messaging system uses an intermediary server to forward each message to the intended recipient. FIG. 1 shows an example of how such a messaging system may be implemented.

Clients A and B are both running instant messaging software 10, 20. If a user of client A wishes to communicate in real-time with a user of client B, client A sends an instant message to a central instant messaging server 40. The instant message contains sender and addressee identification information. Server 40 determines whether the sender of the message is known to the server by using user lookup component 50 to access a list of known users 55. A user will typically have registered with the server via user registration component 60 prior to actual use of the instant messaging software.

Assuming that the user is already known to server 40, the user lookup component 50 and user list 55 is also used to determine whether the addressee of the message is known to the server. Again assuming that the addressee is known, the chat transcript creation component 70 sets up a new chat transcript. The server adds to the transcript in the form [username]: [text of instant message]. This information is then forwarded to client B for display via that client's instant messaging software 10. The same information is also forwarded to client A for display via that client's instant messaging software 20. If a user of client B then replies to the message, the server 40 creates one or more new lines of text according to the same format described above and forwards this to both clients A, B. Each client may then use the information received to add to the chat transcript and to display this to the client's user. The text generated and sent by one of the clients can be characterized as a message from that client while the aggregated messages from all of the chat participants can be characterized as a conversation among the participants.

The chat transcripts are in this example stored locally in a client system by each participant in a chat.

In the example depicted, A and B are involved in a conversation regarding a forthcoming meeting. In the middle of their conversation, at time n, a third user C may be invited by A or B to join their conversation.

Unless A or B has communicated with C outside the framework of the instant messaging conversation, C will probably have no idea what A and B discussed before he was invited to join their chat. The present invention provides a mechanism by which C, within the framework of the instant messaging system, be provided with a summary of the conversation that took place before C joined the conversation The steps by which a summary of A and B's chat is created, is shown with reference to FIG. 2. The componentry for performing those steps is shown in FIG. 3.

At step 100 an invitation is received, from one of the current chat participants (e.g. A or B), by C's invitation receiver 200 to join their chat. At step 110, C's invitation receiver 200 asks (using contact details component 205) the inviter for the contact details of the current chat participants. The inviter has access to such details since they are already chatting with the other participants. The inviter sends the requested details to C who uses such details to request (via Transcript Size Component 210) the number of lines of chat (for the relevant transcript) stored by each participant (step 120). Such information is preferably received as an out-of-band control message. Transcript Size Component 210 then selects the longest transcript and requests that the owning chat participant sends this to C (step 130).

C may simply be provided with participant identifiers and may request chat transcript sizes through the intermediate messaging server 40, or may be provided with full contact details (e.g. an IP address). In the case of the latter, C may contact the participants directly.

It all chat participants have been participating in the chat for the same amount of time, then all transcripts should be of identical length. In this case, Transcript Size Component may simply select one chat transcript either at random, or according to some predefined criteria (e.g. the transcript that is closest to C in terms of network distance).

If, on the other hand, one or more participants joined the chat only after others had started it, the chat transcripts of the participants will be of different lengths.

The selected chat transcript is received at step 140 by the transcript size component 210.

The received chat transcript is provided by transcript summarizer component 220 as input to a summarization service 240 (step 150). This summarization service may be provided somewhere across the network 230. Alternatively such a service may be provided as part of the instant messaging server itself or at one of the chat participants.

The summarization software may be an off the shelf summarization engine. The output of the summarization engine is provided to C. Thus C is able to receive a summary of the chat that previously took place between chat participants A and B.

As indicated above, the messaging server may create each line in the chat transcript for forwarding to the participants in a chat. Such a chat line typically follows the format [username]: [text of instant message]. The username provided to a client by the instant messaging server may be the user's email address. Each client may then render this email address in accordance with a preconfigured shortname. Thus a chat transcript may be littered with the names used by a particular client. It is preferably up to the instant messaging software of the owning chat transcript to convert such nicknames back into full identifiers before sending out a chat transcript to a requesting client. The requesting client can then either submit the transcript in this form or use a converting component (not shown) to map the full identifiers into the nicknames that they have set up for the chat participants.

It is quite possible however, with a multi-party conversation, that not all of the conversation will be highly relevant to a late joiner. It is likely that a user has been invited to join an in-progress conversation because something recently said is relevant to them and perhaps requires their input. Thus, in an alternative embodiment, different portions of a chat transcript are summarized to varying degrees. For example, more recent exchanges more be subject to less summarization than earlier exchanges on the theory that more recent exchanges are likely to be of direct interest to the user for whose benefit the summarization is being performed.

The steps for determining what level of summarization should be performed for different portions or segments of a chat are illustrated in FIG. 4. The componentry that supports the steps is illustrated in FIG. 5.

When a new participant enters a multi-party conversation, a transcript of the entire conversation between the existing participants to date is obtained (step 300) via the process described above (i.e., using the transcript size component 210).

The number of lines in the transcript is determined at step 310 using the transcript size component 210. The number of lines may have been received at step 130 of FIG. 2.

The transcript is divided into x segments by segmenter 400 (step 320). User preferences (not shown) may indicate the number of segments desirable and then the segmenter uses these to divide the received chat transcript into an appropriate number of equal length segments. For example, if the user preferences indicate that four segments are desirable and it is determined that there are fifteen lines in the chat transcript, then three equal segments of four lines are created with a fourth segment containing the remaining three lines. Note, the user preferences may indicate that the number of segments desirable depends on the number of lines in the chat transcript. For example, for transcripts less the 50 lines, 4 segments should be created while for those greater than 50 lines, five or more segments should be created.

In another embodiment, the user may not specify segmentation preferences. Rather the number of segments used may be hard-coded into the instant messaging application.

The segmenter 400 assigns each segment an identifier (e.g., a numerical identifier), thereby giving the segments an order.

For each segment summarization rules 410 are accessed using rules accessor 420. The summarization rules indicate the level of summary required (step 330). For example, a segment having identifier 1 may require 70% summarization while a segment having identifier 5, may require 5% summarization. The theory behind this being that an earlier segment is likely to contain less relevant information than a more recent segments and so can be condensed more.

Transcript Summarizer component 220 inputs each segment to summarization service 240 and indicates the level of summarization required (step 340). Note, current summarization software is already able to summarize text to varying degrees. For example, at least one existing tool allows a user to specify the length of the summary required by dragging a slider bar. In an embodiment of the present invention an automated agent is used to select an appropriate slider position and to input the text to the summarizing software.

For some segments, summarization may not be appropriate. In this instance, such segments are not provided to the summarization service but are retained at the client.

The summarizer component 220 receives the summarized output pertaining to each segment at step 350. Segment Merger Component 430 then merges all x segments back together again and presents the summarized output to the user of client C (step 360). The merger component preferably formats the output appropriately. For example each segment may be given a heading indicating level of summarization, the time frame in which the messages were sent etc.

While, in the embodiment described above, segments are created based on the number of lines in the chat transcript, the invention is not limited to such. In another embodiment, the timestamps of the various contributions are analyzed and a timeline for the conversation is created. This timeline is then divided into a number of sections (for example, four), representing different "phases" of the discussion.

In this embodiment each message is timestamped by the instant messaging server 40 before it is sent to the participating clients. Use of the server's clock to timestamp instant messages ensures that the timestamps of all messages are in sync and that there are no distributed clock discrepancies. Rules are provided which determine how to make use of the timestamps in dividing up a conversation. For example, if the conversation has lasted 30 minutes, the conversation may be divided up into 10 minute segments.

Other more sophisticated approaches may be used which might give more accurate divisions into the "early", "middle", "later", etc., phases of the conversation. For example, the number of contributions by different people might be analyzed to glean additional insight into the structure of the conversation. Work has been done by Toronto University in this area. This work involved analyzing archived transcripts of seminars, conference calls, discussions etc. to add descriptive metadata thereto in order to enable interesting parts of a transcript to be identified. For example, there was analysis of the number of people involved and the speed of interaction (speed could indicate an argument). The work also involved using the type of conversation to determine the structure of the conversation. For example, in a conference call the preamble typically involves the parties introducing themselves and may be of less interest than the concluding part of the call when the call content may be summarized.

In an embodiment of the present invention, the number of phases could also be determined based on the stricture of the conversation. In this example embodiment, four to six phases is thought to be sufficient.

Whatever method is used, this mechanism for summarizing an instant messaging conversation to varying degrees enables a new participant to quickly get up to speed with the conversation that has gone before and helps them fully participate in what has happened most recently in the discussion.

The ensuing summarization is preferably delivered to the new participant via the collaborative tool being used (e.g. Instant Messaging), using its standard APIs. It is preferable for the catch-up text to be presented either in a new window on the new participant's screen or alternatively to be presented as the first few lines in the conversation that they are about to join.

The foregoing discussion is particularly relevant to a new participant to an outgoing instant messaging conversation or perhaps to a participant who has temporarily withdrawn from the conversation, possibly as a result of an external distraction. However, a client already involved in an instant messaging conversation does not necessarily want to see a summary of the previous discussion (unless specifically requested). Thus a mechanism is provided whereby a summary is provided to a user depending upon when they last participated in the discussion. Foe example, if they contributed within the last 5 minutes or the last 5 interchanges then a summary may not be required. However if the user has been away for longer, then a summary might indeed be extremely useful. The time or number of interchanges that would have to elapse before a participant would automatically receive a new summary is preferably configured by the user. These options are preferably applied regardless of whether a user's Instant Messaging client happened to remain connected to the discussion throughout the intervening period.

Figure 6:
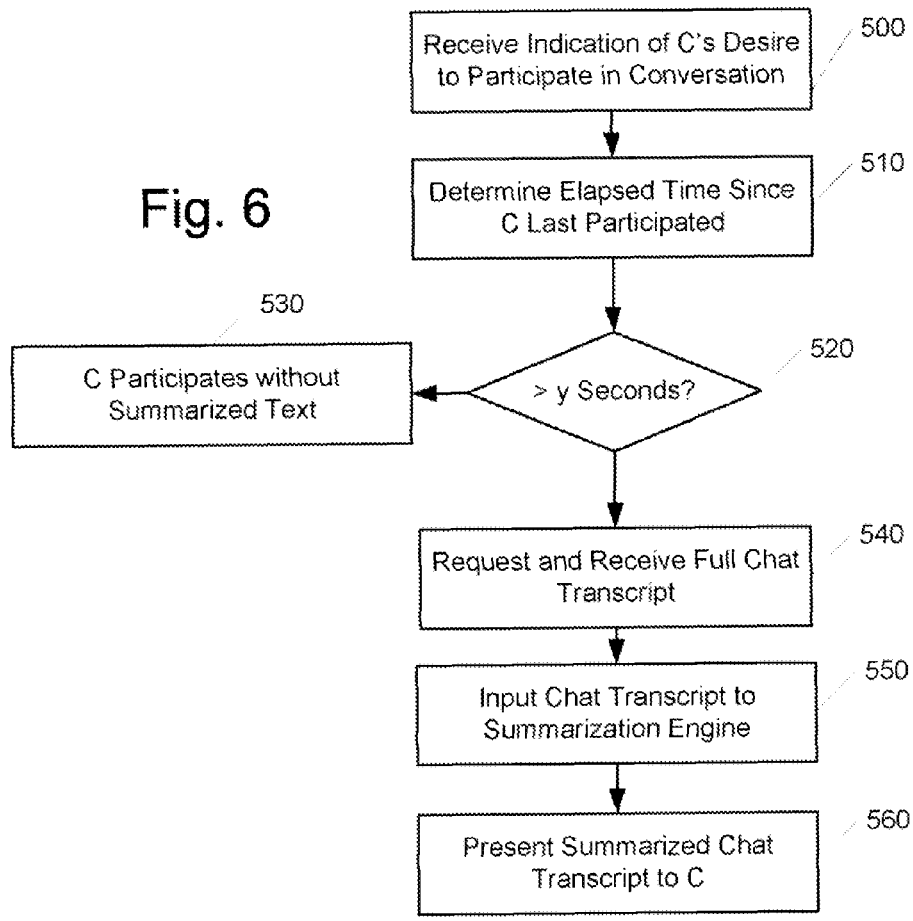
FIG. 6 illustrates a process for generating a representation of a chat, including summarized text created in accordance with the present invention, for presentation to an instant messaging participant.
Figure 7:
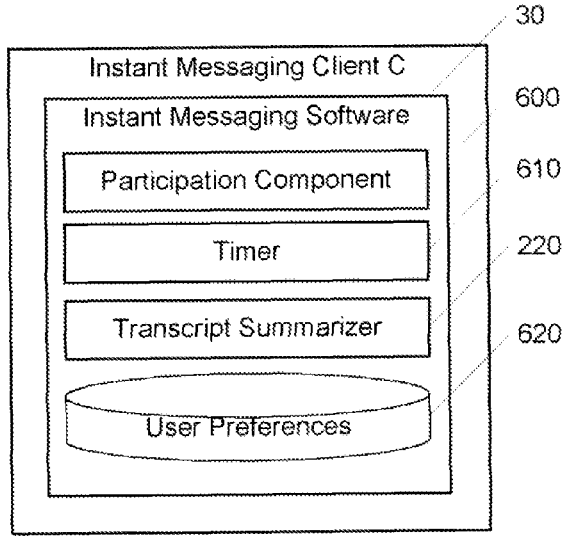
FIG. 7 illustrates the components of a system for performing the process illustrated in FIG. 6.

The processing and componentry of this embodiment of the present invention will be discussed with reference to FIGS. 6 and 7.

At step 500, C's instant messaging software receives an indication of C's desire to participate in an instant messaging, conversation (participation component 600). Such an indication may be via a relevant chat window gaining focus. However, in some instances the user's chat window may stay in focus while they attend a meeting or become distracted in some other way. Thus it may be necessary for the user to actively indicate that they now desire to participate in a conversation. For example, the user may be presented with a button to select when they want to participate.

Once an indication has been received, the elapsed time since the user last participated in the conversation is determined at step 510 (time component 610). Preferably its is the elapsed time since the user last sent a message which is monitored and used at this point.

If the elapsed time is less than "y" seconds (i.e., the user participated relatively recently), then the user participates in the conversation as per normal (steps 520, 530). If on the other hand more than "y" seconds have elapsed, then a full chat transcript is requested and received (steps 520, 540) by transcript summarizer component 220.

The transcript is input to the summarization engine and a summary received therefrom by transcript summarizer component 220 for presentation to the user (steps 550, 560).

The user is preferably able to configure when a summary is desired (i.e. "y"). Such information is stored as user preferences 620

Once again, a user may not want a complete summary of the whole chat transcript. Instead the level of summary may be varied as described above.

As indicated above, the summarization software may be located in any one of a number of places. It may form part of the instant messaging software itself or it may be a separate service located elsewhere in the network. Alternatively, it may form part of the instant messaging server or be collocated with the instant messaging server. Since summarization software can consume considerable storage space and processing capability, it is preferable to provide this as a separate service.

Also as indicated above, an off the shelf summarization engine is preferably used for the summarization process. For any such software that is not capable of handling the type of dialogue provided by an instant messaging service, the technology described with reference to co-pending U.S. patent application Ser. No. 10/660,063 (interal docket number GB92002082) may be used. This patent application describes a mechanism by which context is added to a chat transcript to indicate the way (emotion) in which one user conveys information to another user. Thus information about the way in which something is said is added to the instant messaging transcript (angrily, loudly etc.) The instant messaging transcript is then further manipulated to form continuous text and to remove any identifier/nickname information. Rules may also be provided to add proper punctuation and to render short-form words properly (e.g. u→you, r→are etc.). Thus the following;

Lucas: When have you scheduled that meeting for?
Bharat: Oh gosh I had forgotten all about it!
Lucas: Never mind :-)
Bharat: Right, lets meet at 2pm.
Lucas: In the conference room?
Bharat: Good idea.
Lucas: See you then.
Bharat: Bye
might become:

"When have you scheduled that meeting for?", asked Lucas. "Oh gosh, I had forgotten all about it!", exclaimed Bharat.

"Never Mind", chuckled Lucas. "Right, lets meet at 2pm.", said Bharat. "Good idea.", agreed Bharat. "See you then.", said Lucas. "Bye", said Bharat.

Any rules used in the summarization service may be provided as part of the instant messaging software or they may be provided by the instant messaging server or the summarization service. Such rules may then be requested by the instant messaging client.

Segmentation of any chat transcript does not have to be done by the instant messaging client but may instead be performed by the summarization service (by a plugin) or by the instant messaging server itself.

While the invention has been described in terms of chat transcripts stored at each instant messaging client, this does not have to be the case. Transcripts could instead be stored at the instant messaging server.

Finally, while the invention has been described in terms of instant messaging, the invention is not limited to such. The invention is equally applicable to documents such as emails, blogs etc. or document structures such as threaded newsgroups and wikis.

For example, the invention could be used to summarize an email on the basis of when the email was last opened. Whether or not an email is summarized might also depend on its length. This is also true of a word processing document. The number of documents in a wiki document structure may also be taken into account or the length of a particular document in the wiki structure. Thus a summary may be presented to a user depending upon when the document was last opened and also its length. For example, documents over 500 words might be summarized, whereas smaller documents will not be. With a wiki, a timestamped cookie may be stored on a user's computer and used to determine when the user last visited the wiki. Newsgroup discussions may also be summarized based on when the user last accessed the newsgroup. For example, the user may select a certain threaded discussion within the newsgroup for summarization. An agent is then used to extract the text from each newsgroup post and to format the text (for example to indicate who the post was from) prior to submitting the text for summarization. The number of new posts since the user last interacted with the document structure may also be taken into account.

It is also true that different portions of a document may be summarized to varying degrees depending upon where text occurs. This may be based on the total numbers of sentences or the time period over which the text was added. In a threaded newsgroup discussion, the discussion may be summarized differently depending upon how far into the discussion a particular reply is. Varying the level of summarization is particularly useful with documents and document strictures that are not added to randomly. In other words, documents/ document structures when new matter is added to the end of the document or structure. For example, this is particularly useful with emails which contain vast quantities of historical text (past emails) leading up to the most current state of affairs.

It should be appreciated that the various embodiments described may work in conjunction with one another.

What is claimed is:

1. A method comprising:
  determining that a chat summary will be provided to a participant in a multi-participant instant messaging chat session;
  retrieving a transcript of the multi-participant instant messaging chat session from machine-readable memory;
  a machine segmenting the transcript into a plurality of transcript segments;
  the machine summarizing each of the transcript segments to generate summaries of the transcript segments;
  the machine merging the summaries of the transcript segments to generate the chat summary; and
  supplying the chat summary to the participant.

2. The method of claim 1 further comprising:
  retrieving data about a plurality of transcripts of the chat session, wherein the plurality of transcripts comprises the transcript; and
  determining that the transcript is a most comprehensive of the plurality of transcripts of the multi-participant instant messaging chat session based on the data about the plurality of transcripts, wherein each of the plurality of transcripts corresponds to a respective one of a plurality of participants in the multi-participant instant messaging chat session;
  wherein said retrieving the transcript of the multi-participant instant messaging chat session is based, at least in part, on said determining that the transcript is the most comprehensive of the plurality of transcripts.

3. The method of claim 1 further comprising:
  determining a number of lines of the transcript,
  wherein said segmenting the transcript into the plurality of transcript segments is based, at least in part, on the number of lines of the transcript.

4. The method of claim 1, wherein said summarizing each of the transcript segments to generate summaries of the transcript segments comprises summarizing each of the transcript segments to varying degrees, with respect to participation in the multi-participant instant messaging chat session by the participant.

5. The method of claim 1, wherein said supplying the chat summary to the participant comprises displaying the chat summary in one of an instant messaging user interface and a user interface separate from the instant messaging user interface.

6. The method of claim 1, wherein said determining that the chat summary will be provided to the participant in a multi-participant instant messaging chat session comprises one of determining that the participant has joined the multi-participant instant messaging chat session after the multi-participant instant messaging chat session has started, determining that the participant has rejoined the multi-participant instant messaging chat session, and determining that the participant has not participated within a threshold amount of time.

7. The method of claim 1 further comprising:
  determining different phases of the multi-participant instant messaging chat session,
  wherein said segmenting the transcript into the plurality of transcript segments is based, at least in part, on the different phases.

8. The method of claim 7, wherein said determining the different phases of the multi-participant instant messaging chat session comprises:
  generating a timeline of the multi-participant instant messaging chat session with timestamps of messages of the multi-participant instant messaging chat session; and
  analyzing the multi-participant instant messaging chat session.

9. The method of claim 8, wherein said analyzing the multi-participant instant messaging chat session comprises analyzing at least one of number of messages contributed by each of a plurality of participants of the multi-participant instant messaging chat session, the messages to determine a type of the multi-participant instant messaging chat session, speed of interaction among the plurality of participants, and a structure of the multi-participant instant messaging chat session.

10. A method comprising:
   a machine segmenting a transcript of a multi-participant electronic conversation into a plurality of transcript segments;
   the machine summarizing each of the transcript segments to varying degrees, with respect to participation in the multi-participant electronic conversation by a participant, to generate summaries of the transcript segments;
   the machine merging the summaries of the transcript segments to generate a conversation summary; and
   supplying the conversation summary to the participant.

11. The method of claim 10, wherein the multi-participant electronic conversation comprises one of an instant messaging chat session, a threaded newsgroup, an electronic mail message, and a blog entry.

12. The method of claim 10 further comprising:
   retrieving data about a plurality of transcripts of the multi-participant electronic conversation, wherein the plurality of transcripts comprises the transcript; and
   determining that the transcript is a most comprehensive of the plurality of transcripts based on the data about the plurality of transcripts, wherein each of the plurality of transcripts corresponds to a respective one of a plurality of participants in the conversation;
   wherein said retrieving the transcript of the multi-participant electronic conversation is based, at least in part, on said determining that the transcript is the most comprehensive of the plurality of transcripts.

13. The method of claim 10 further comprising:
   determining a number of lines of the transcript,
   wherein said segmenting the transcript into the plurality of transcript segments is based, at least in part, on the number of lines of the transcript.

14. The method of claim 10 further comprising:
   determining different phases of the multi-participant electronic conversation,
   wherein said segmenting the transcript into the plurality of transcript segments is based, at least in part, on the different phases.

15. The method of claim 10 further comprising one of determining that the participant has joined the multi-participant electronic conversation after the multi-participant electronic conversation has started, determining that the participant has rejoined the multi-participant electronic conversation, and determining that the participant has not participated in the multi-participant electronic conversation within a threshold amount of time.

16. A non transistory computer program product comprising a computer usable storage media embodying program instructions for performing instant messaging text summarization, said program instructions when executed in a computer causing the computer to perform operations comprising:
   determining that a chat summary will be provided to a participant in a multi-participant instant messaging chat session;
   retrieving a transcript of the multi-participant instant messaging chat session;
   segmenting the transcript into a plurality of transcript segments;
   summarizing each of the transcript segments to generate summaries of the transcript segments;
   merging the summaries of the transcript segments to generate the chat summary; and
   supplying the chat summary to the participant.

17. The non transitory computer program product of claim 16, wherein the operations further comprise:
   retrieving data about a plurality of transcripts of the chat session, wherein the plurality of transcripts comprises the transcript; and
   determining that the transcript is a most comprehensive of the plurality of transcripts of the multi-participant instant messaging chat session based on the data about the plurality of transcripts, wherein each of the plurality of transcripts corresponds to a respective one of a plurality of participants in the multi-participant instant messaging chat session;
   wherein said operation of retrieving the transcript of the multi-participant instant messaging chat session is based, at least in part, on said determining that the transcript is the most comprehensive of the plurality of transcripts.

18. The non transistory computer program product of claim 16, wherein the operations further comprise:
   determining a number of lines of the transcript,
   wherein said operation of segmenting the transcript into the plurality of transcript segments is based, at least in part, on the number of lines of the transcript.

19. An apparatus comprising:
   a processor;
   a network interface;
   a transcript segmenting unit operable to,
      determine that a chat summary will be provided to a participant in a multi-participant instant messaging chat session,
      retrieve a transcript of the multi-participant instant messaging chat session,
      segment the transcript into a plurality of transcript segments; and
   a transcript summarizer coupled with the transcript segmenting unit, the transcript summarizer operable to,
      summarize each of the transcript to generate summaries of the transcript segments,
      merge the summaries of the transcript segments to generate the chat summary, and
      supply the chat summary to the participant.

20. The apparatus of claim 19, wherein the transcript segmenting unit is further operable to:
   retrieve data about a plurality of transcripts of the chat session, wherein the plurality of transcripts comprises the transcript; and
   determine that the transcript is a most comprehensive of the plurality of transcripts of the multi-participant instant messaging chat session based on the data about the plurality of transcripts, wherein each of the plurality of transcripts corresponds to a respective one of a plurality of participants in the multi-participant instant messaging chat session;
   wherein the transcript segmenting unit being operable to retrieve the transcript of the multi-participant instant messaging chat session is based, at least in part, on the transcript segmenting unit determining that the transcript is the most comprehensive of the plurality of transcripts.

* * * * *